(12) United States Patent
McQueen

(10) Patent No.: US 10,909,713 B2
(45) Date of Patent: Feb. 2, 2021

(54) SYSTEM AND METHOD FOR ITEM LOCATION, DELINEATION, AND MEASUREMENT

(71) Applicant: Datalogic USA, Inc., Eugene, OR (US)

(72) Inventor: Alexander M. McQueen, Eugene, OR (US)

(73) Assignee: DATALOGIC USA, INC., Eugene, OR (US)

(*) Notice: Subject to any disclaimer, the term of this patent is extended or adjusted under 35 U.S.C. 154(b) by 112 days.

(21) Appl. No.: 16/170,356

(22) Filed: Oct. 25, 2018

(65) Prior Publication Data

US 2020/0134851 A1 Apr. 30, 2020

(51) Int. Cl.
*G06T 7/70* (2017.01)
*G06T 7/13* (2017.01)
*G06T 7/90* (2017.01)

(52) U.S. Cl.
CPC ............... *G06T 7/70* (2017.01); *G06T 7/13* (2017.01); *G06T 7/90* (2017.01)

(58) Field of Classification Search
CPC .................................... G06T 7/70; G06T 7/13
See application file for complete search history.

(56) References Cited

U.S. PATENT DOCUMENTS

| | | | |
|---|---|---|---|
| 4,873,651 A | 10/1989 | Raviv | |
| 6,455,835 B1* | 9/2002 | Bernardini | G01B 11/2433 250/208.1 |
| 7,376,284 B2 | 5/2008 | Tao et al. | |
| 8,743,374 B2 | 6/2014 | Nakatsukasa | |
| 2004/0119987 A1* | 6/2004 | Madsen | H05K 13/0813 356/614 |

FOREIGN PATENT DOCUMENTS

JP 2006277303 A 10/2006

\* cited by examiner

*Primary Examiner* — Tuan H Nguyen
(74) *Attorney, Agent, or Firm* — Shook, Hardy & Bacon L.L.P.

(57) ABSTRACT

A location, dimension, and height of an object can be determined and measured using shadows. The object is located on a surface and an array of lights is mounted over the surface and shines on the object. The surface can be switchable between a translucent state and a transparent state. A colored shadow occurs based on the color of the light that shines on the object, where red, green, and blue are the typical colors used to provide shadows. A camera that is located below the surface captures an image of the shadows. The camera can be a color camera or a monochrome camera. The image is processed using thresholding to segment the different types of shadows that can occur. With the shadows, calculations can be made to determine the location, dimension, and height of the object.

18 Claims, 9 Drawing Sheets

SYSTEM AND METHOD FOR ITEM LOCATION, DELINEATION, AND MEASUREMENT

CROSS-REFERENCE TO RELATED APPLICATIONS

None.

BACKGROUND

Object recognition systems which must distinguish individual objects in a group often struggle with determining the boundaries of each object, especially if the objects are in close proximity, touching, or overlapping. Significant amounts of computational power are typically expended in attempting to determine individual boundaries of multiple items. This problem is exacerbated by the use of machine vision systems which view a scene of objects resting upon a surface from a vantage point above the objects, or which view the scene through an optically-transmissive surface from below if the scene illumination is not well controlled.

Previous systems have been devised which may contain some similar elements related to determining the characteristics of an object based upon its shadow. Such previous systems can be found in U.S. Pat. Nos. 4,873,651; 7,376,284; and 6,455,835. However, the present invention combines the similar elements with new elements in an innovative system and method of use.

A solution is needed that allows for objects to be located, measured, and distinguished from other objects when scanned.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one example, the proposed system described herein utilizes a controlled combination of colored light sources, a color imaging system, and a diffuse reference surface upon which items are placed, in order to locate the position and approximate three-dimensional size of these items. The system first uses a broad, extended source comprised of many individual light sources to minimize shadows of the items on the reference surface. This allows the system to more easily detect the shadow outline of only the base surface of the items where they contact the reference surface. Next, the system uses a red, green, and blue triplet of light sources to form three different colored shadows of each item on the reference surface, which may all be captured in one color image. Finally, using simple trigonometric relationships of the light sources and the various color image shadows, the height of items on the reference surface may then be deduced.

More particularly, the proposed system implements the following method:

Establishing a diffuse, white light-translucent reference surface upon which objects to be examined are placed;

Mounting a color camera below the reference surface such that the field-of-view of the camera can capture the entire area of the reference surface where objects may be placed;

Having a computer-based image processing system connected to the color camera;

Placing an array of light sources above the reference surface at a height that will not interfere with the placing of objects on the surface but which may create shadows of objects which will fully fall on the reference surface;

Placing objects to be examined on the reference surface;

Illuminating the scene of objects with sources from many angles surrounding the objects from above;

Collecting an image of the dark areas under the objects' bases from the color camera below the reference surface;

Thresholding said image of object bases to enhance to location and shape of the object bases;

Determining the centroids and boundaries of the placed objects bases;

Capturing a color image of the objects' color shadows using the color camera below the reference surface;

Selecting color components of the image to obtain distinct object shadow information; and Using the previously determined object base locations and boundaries data, along with the objects' shadow information and information about the source locations to determine object heights.

In another example, the proposed system described herein utilizes a controlled combination of colored light sources, an imaging system (preferably color), and an electrically switchable reference surface upon which items are placed. When the switchable surface is in its translucent state, the system can locate the position and approximate a three-dimensional size of these items. When the surface is changed to its transparent state, any identifying characteristics of the item, such as barcodes, digital watermarks, general printed material or colors, may also be recognized by the system. In one phase of item assessment, the system uses a broad, extended source comprised of many individual light sources to minimize shadows of the items on the translucent reference surface. This allows the system to more easily detect the shadow outline of only the base surface of the items where the items contact the reference surface. In another phase, the system uses a red, green, and blue triplet of light sources to form three different colored shadows of each item on the translucent reference surface, which may all be captured in one color image. In yet another phase, using simple trigonometric relationships of the light sources and the various color image shadows, the height of items on the translucent reference surface may then be deduced. In another phase, the system switches the reference surface to its transparent state, turns on white light sources below the reference surface, and attempts to identify objects based upon any further information it may observe, such as colors, barcodes or other codes, digital watermarks, patterns, or other recognizable characteristics.

More particularly, the proposed system implements the following method:

Establishing a switchable reference surface upon which objects to be examined are placed;

Mounting a color camera below the reference surface such that the field-of-view of the camera can capture the entire area of the reference surface where objects may be placed;

Having a computer-based image processing system connected to the color camera;

Placing an array of light sources above the reference surface at a height that will not interfere with the placing of objects on the surface but which may create shadows of objects which will fully fall on the reference surface;

Placing objects to be examined on the reference surface;

Switching the reference surface to an optically translucent or diffusive state;

Illuminating the scene of objects with sources from many angles surrounding the objects from above;

Collecting an image of the dark areas under the objects' bases from the color camera below the reference surface;

Thresholding said image of object bases to enhance to location and shape of the object bases;

Determining the centroids and boundaries of the placed objects bases;

Illuminating the scene of objects from above with three different color sources, typically red, green, and blue, each separated by approximately 90 degrees in azimuth;

Capturing a color image of the objects' color shadows using the color camera below the reference surface;

Selecting color components of the image to obtain distinct object shadow information;

Using the previously determined object base locations and boundaries data, along with the objects' shadow information and information about the source locations to determine object heights;

Switching the reference surface to an optically transparent state;

Illuminating the scene of objects from below the reference surface with a plurality of light sources, typically white;

Capturing one or more images of the objects from below the reference surface;

Attempting to recognize the objects by using identifying features such as bar codes, color codes, text, color, patterns, digital watermarks, shape, texture, etc; and Associating the identified objects with specific locations and other physical characteristics derived previously.

BRIEF DESCRIPTION OF THE DRAWINGS

The present invention is illustrated by way of example and not limitation in the accompanying figures in which like reference numerals indicate similar elements and in which.

DETAILED DESCRIPTION

Figure 1:
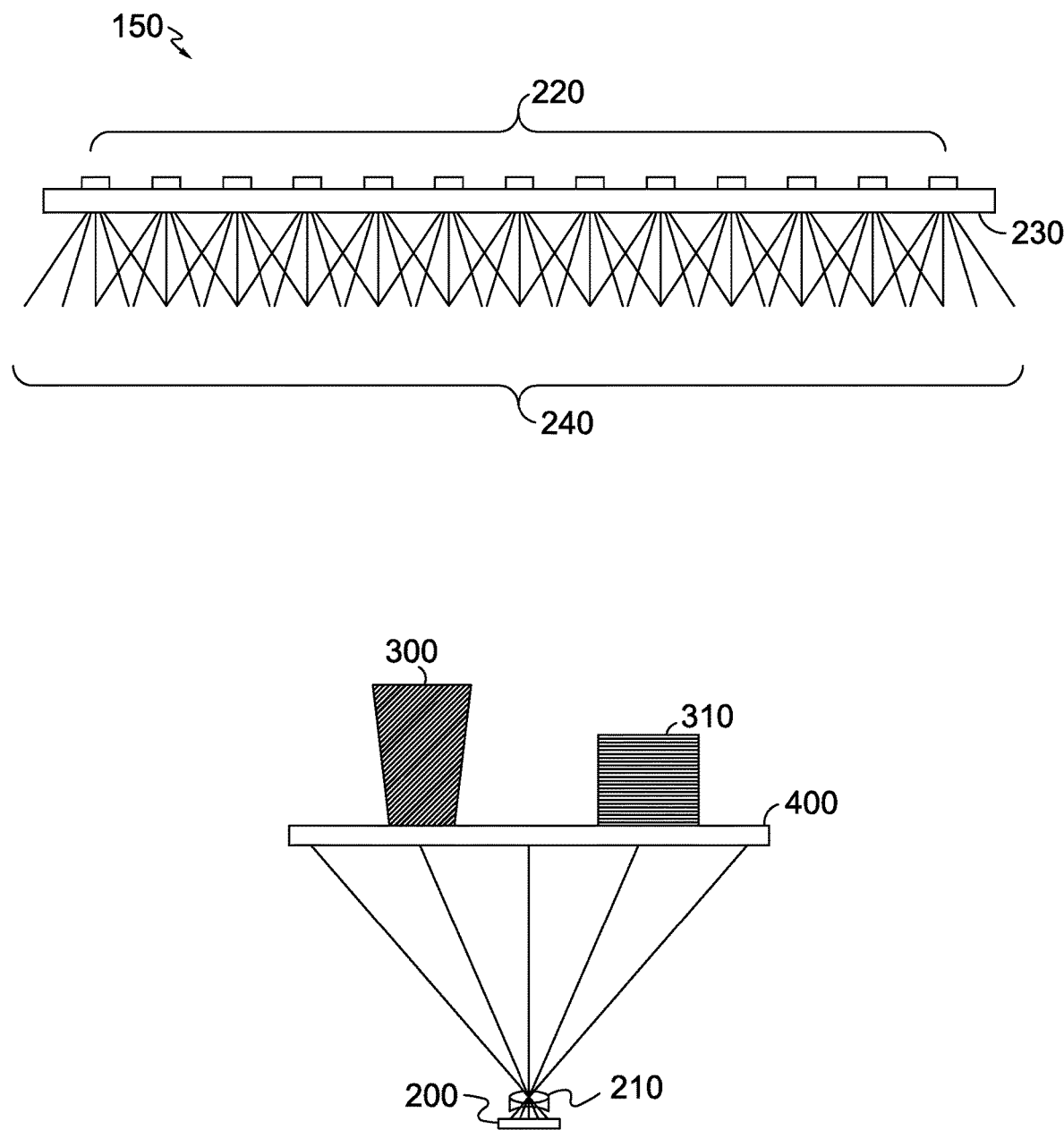
FIG. 1 is an illustration of a system for determining the location and size of an object, implemented in accordance with an embodiment of the present invention.

The subject matter of aspects of the present invention is described with specificity herein to meet statutory requirements. However, the description itself is not intended to limit the scope of this patent.

Embodiments of the invention described herein provided several advantages and improvements, including improving effectiveness of object boundary detection; reducing reliance on three-dimensional cameras, which often provide noisy or partially-obscured data; reducing computational requirements necessary for determining object boundaries and size; reducing confusion in actual boundary locations due to confounding shadows; utilizing color images to reduce the number of frames needed for analysis; and reducing the total number of cameras necessary to perform item recognition.

In a first aspect, an object recognition system determines a location, delineation, and measurement of an item. A surface holds the item, a plurality of light sources surround the item on the surface, and an imaging system views the item. The plurality of light sources is located in a position that minimizes shadows of the item on the surface. The imaging system detects a shadow outline of a base surface of the item. The base surface is where the item contacts the surface. The plurality of light sources includes subsets of red light sources, green light sources, and blue light sources. The red light sources, green light sources, and blue light sources respectively form colored shadows of the item on the surface. The colored shadows are captured in one color image by the imaging system. A position, an exterior or delineation, or a height of the item on the surface is calculated.

In a second aspect, a system for describing a location, delineation, and measurement of an item is described that includes establishing a diffuse, white light-translucent reference surface upon which objects to be examined are placed. A color camera is mounted below the reference surface such that the field-of-view of the camera can capture an entire area of the reference surface where objects may be placed. A computer-based image processing system is connected to the color camera. An array of light sources is placed above the reference surface at a height that will not interfere with the placing of objects on the surface, but which creates shadows of objects that fall on the reference surface. Objects to be examined are placed on the reference surface. The scene of objects is illuminated with sources from various angles surrounding the objects. An image of the dark areas is collected under the objects' bases from the color camera below the reference surface. The image of object bases is put through a process of thresholding to enhance the location and shape of the object bases. Thresholding of the image allows individual objects to be discerned or segmented. The centroids and boundaries of the objects bases are determined. The scene of objects is illuminated with three different color sources, typically red, green, and blue, each separated by approximately ninety (90) degrees in azimuth. A color image of the objects' color shadows is captured using the color camera below the reference surface. Color components of the image are selected to obtain distinct object shadow information. Object heights are determined using the previously determined object base locations and boundaries data along with the objects' shadow information and information about the source locations.

Beginning with FIG. 1, a system 150 for determining an item location and approximate three-dimensional size is shown. An overhead array of point light sources 220 on a suspended mounting structure 230 provides illumination 240 from above. Typical objects to be characterized, represented by items 300 and 310, rest on an optically translucent reference platform 400 or an optically switchable reference platform 400, set to its translucent state. In another embodiment, typical objects to be characterized, represented by items 300 and 310, rest on an optically switchable reference platform 400 set to its translucent state. An imaging camera, comprising a lens system 210 (schematically depicted as a doublet, but may be any lens system), and a solid-state imager 200, views the underside of the reference platform 400.

Figure 2:
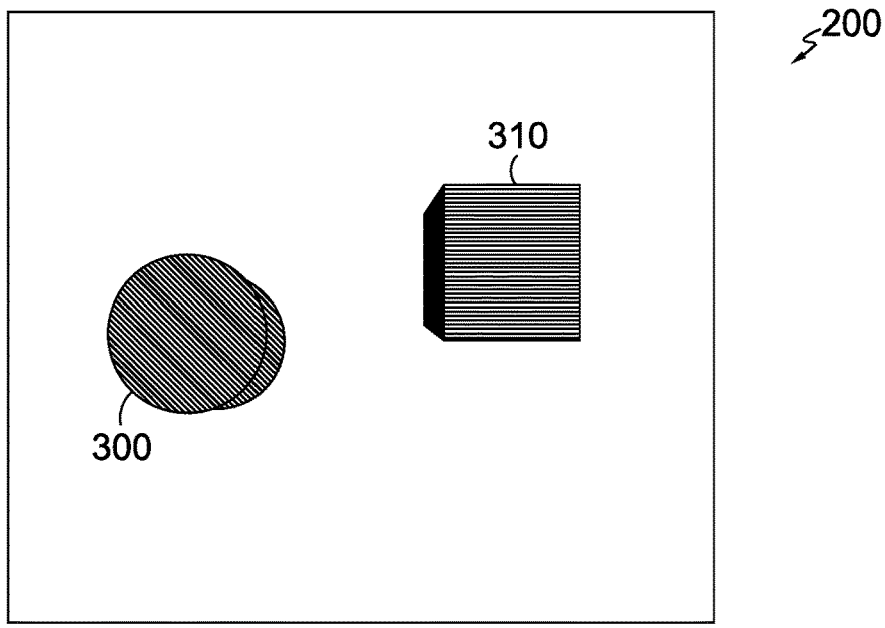
FIG. 2 is an illustration of a camera view of FIG. 1 from a below a reference surface, implemented in accordance with an embodiment of the present invention.

For orientation purposes, FIG. 2 shows how the camera system would view the items from below if the reference surface were transparent rather than diffuse, in a view 200.

In operation, a first step is to determine the general shape and location of the items' bases where they contact the reference surface, which is in its translucent state. In one embodiment, the reference surface is in its translucent state. In this step, as displayed in FIG. 3, a plurality of point sources, such as 220, are switched on in a view 300. In the preferred embodiment, the sources used for this step are generally "white" in character to improve the signal-to-noise ratio of the color image. The individual sources 220 may comprise integrated RGB LEDs or white LEDs. Not all sources mounted on support structure 230 necessarily need to be illuminated during this phase. The main concept is that the uniformly-surrounding illumination will minimize well-defined shadows of the items except directly under their bases where most light will not reach, allowing a more distinct outline of the item's base.

Figure 3:
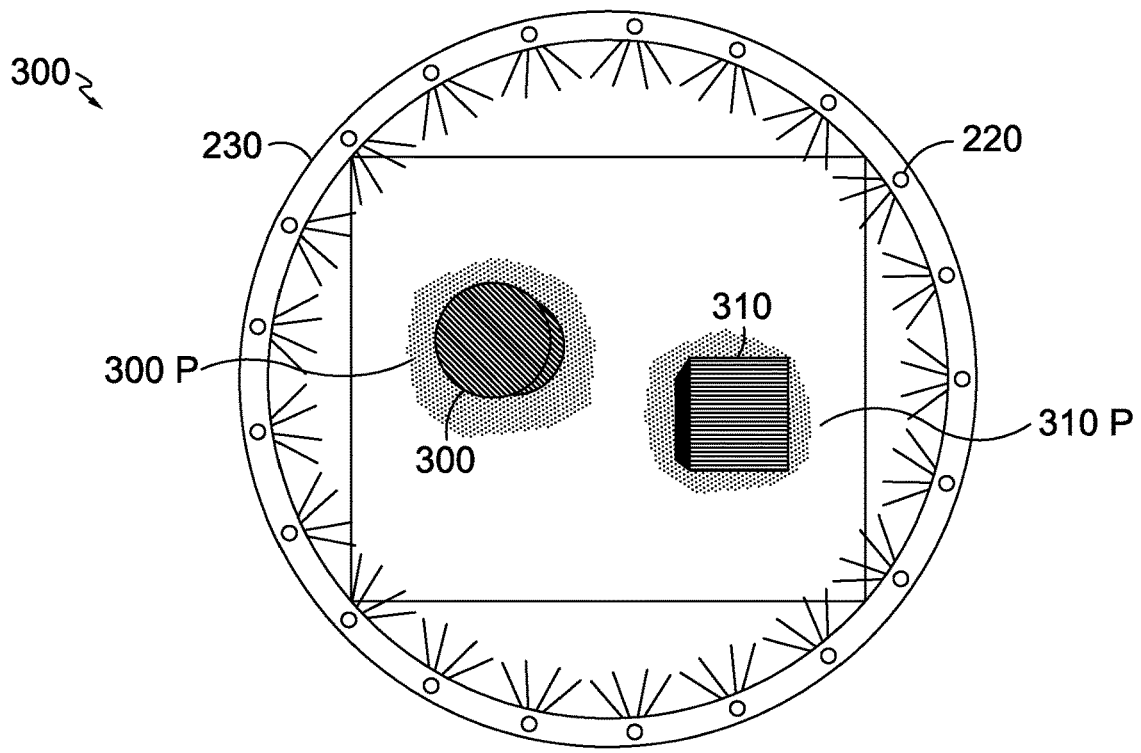
FIG. 3 is an illustration of a view of FIG. 1 from above the reference surface, implemented in accordance with an embodiment of the present invention.

FIG. 3 shows how the scene would look from overhead, with ill-defined, slightly shaded, low contrast penumbral regions 300 P and 310 P caused by the fact that there are only a finite number of light sources being used.

Figure 4:
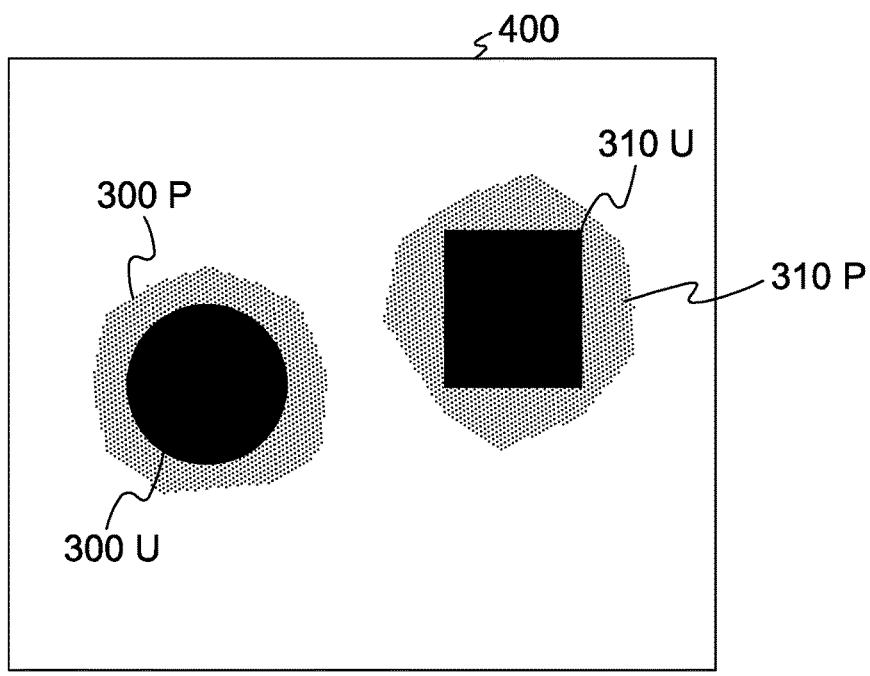
FIG. 4 is an illustration of a camera view from below a diffuse reference surface where higher contrast umbral regions and lower contrast penumbral regions are shown, implemented in accordance with an embodiment of the present invention.

FIG. 4 shows in a view 400 the same step as viewed by the system's color camera from below the diffuse reference surface or from below the reference surface in its translucent state. In viewing from below, the camera detects the higher contrast umbral regions 300 U and 310 U along with the lower contrast penumbral regions 300 P and 310 P.

Figure 5:
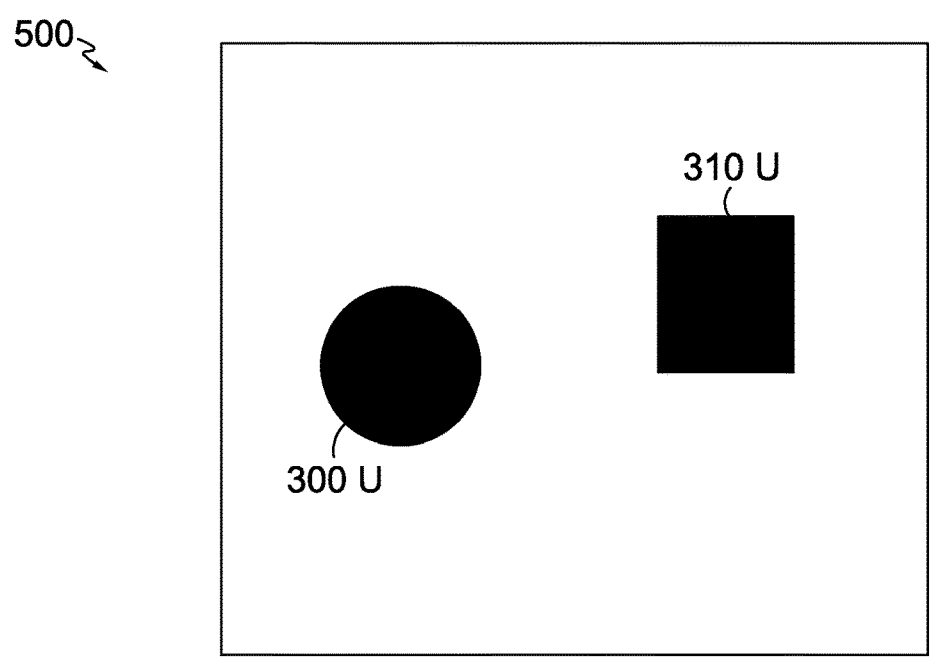
FIG. 5 is an illustration of a camera view from below a diffuse reference surface where higher contrast umbral regions are shown after thresholding (image processing), implemented in accordance with an embodiment of the present invention.

The next step in the present system's operation is to remove the low contrast penumbral regions surrounding the item bases by standard image processing techniques such as image thresholding. Image thresholding (or image segmentation) is one process of partitioning a digital image into multiple segments. The goal of segmentation is to simplify and/or change the representation of the image into something that is easier to analyze. The result of this processing step, which leaves only the umbral shapes 300 U and 310 U, is shown in FIG. 5 in a view 500.

Figure 6:
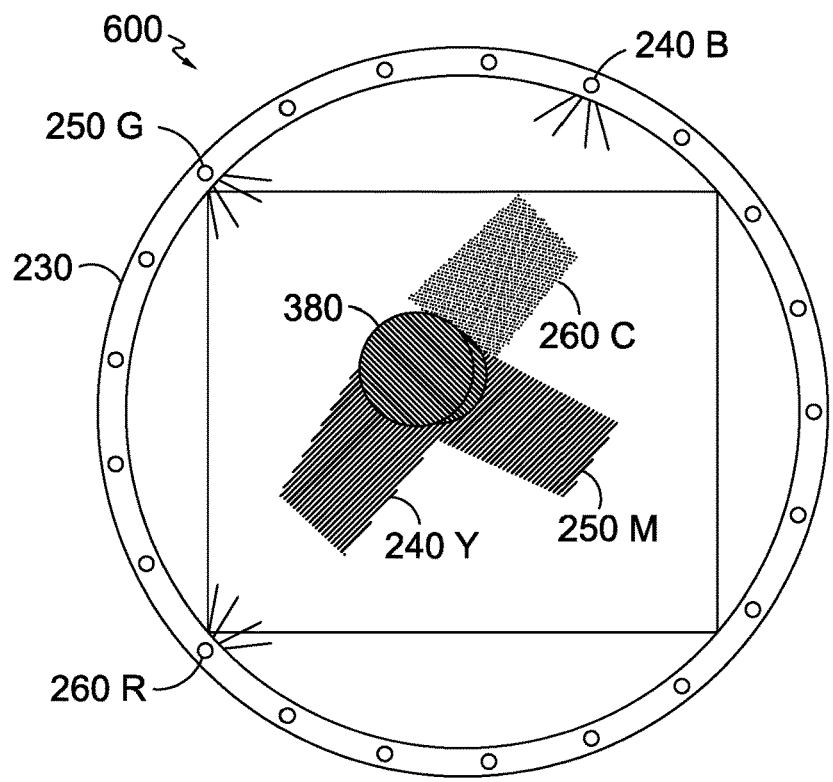
FIG. 6 is an illustration of an overhead view showing the resulting shadows of an object from colored light sources, implemented in accordance with an embodiment of the present invention.

The next step in this process is to illuminate the scene with separate red, green, and blue point light sources simultaneously. These light sources may be individually-energized color components of integrated RGB LEDs, or they may be discrete color LEDs or other light sources. In general, these three color sources will be arranged at different angles around the scene. As an example, they may be spaced approximately ninety (90) degrees apart around the support structure. The intent of this arrangement is to maximize the spatial separation of the three resulting shadows in order to make analysis simpler. FIG. 6, in a view 600, depicts this part of the process, showing the arrangement from an overhead view. Red light source 260 R, green light source 250 G, and blue light source 240 B are disposed around the support structure 230 at approximately 90 degree increments. These sources produce three relatively sharp shadows of the item 380 which is resting on the reference surface. The three shadows represent white light minus one of the three color components. So, for example, the shadow 240 Y is white light (red+green+blue) minus the color that is blocked by the item (blue) which results in a red plus green (or yellow) shadow. Often, in 'subtractive color' parlance, yellow is referred to as 'minus blue.' Similarly, the shadow 260 C, caused by the blocking of the red source, is a 'minus red' color, also known as cyan or green plus blue. Following the same concept, the shadow 250 M, caused by blocking of the green source, is a 'minus green' color, also known as magenta or red plus blue.

By using the color camera to capture this scene from below, as shown in a view 700 in FIG. 7, all three shadows may be captured in one exposure, saving process time. In one embodiment, the reference surface is still in its translucent state. In this step, in a particular embodiment, the reference surface can is still in its translucent state. The generally dark region 390 directly under the base may be used as an alternative to the separate step mentioned earlier with white illumination for determining the shape of the item base, but its shape may not be as well defined by using only the three color sources. Also, more color source triplets, at various dispositions around the scene may be illuminated in sequence and more frames captured if more detail is needed or if item shadows are interfering with each other.

Figure 7:
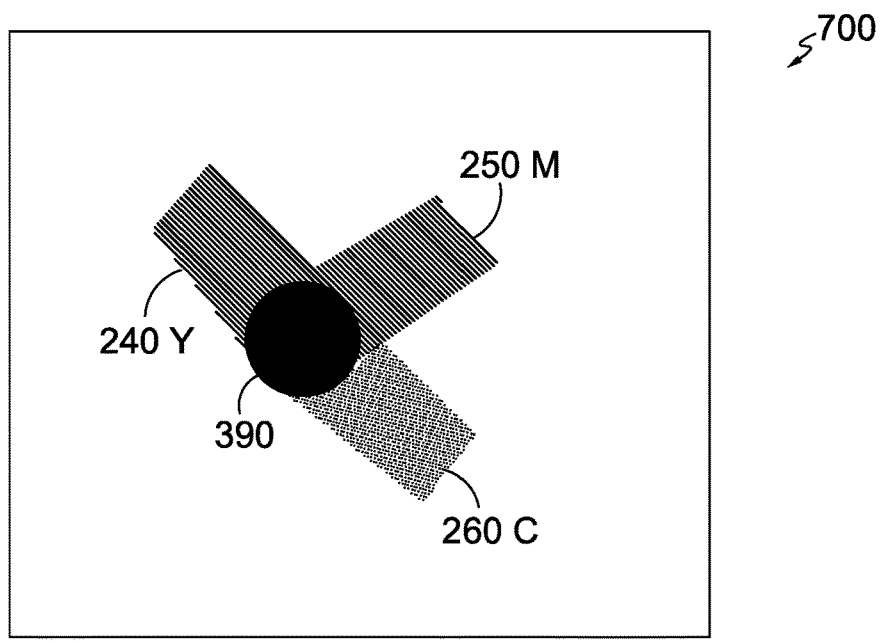
FIG. 7 is another illustration of a view from below a diffuse reference surface showing the resulting shadows of an object from colored light sources, implemented in accordance with an embodiment of the present invention.
Figure 8:
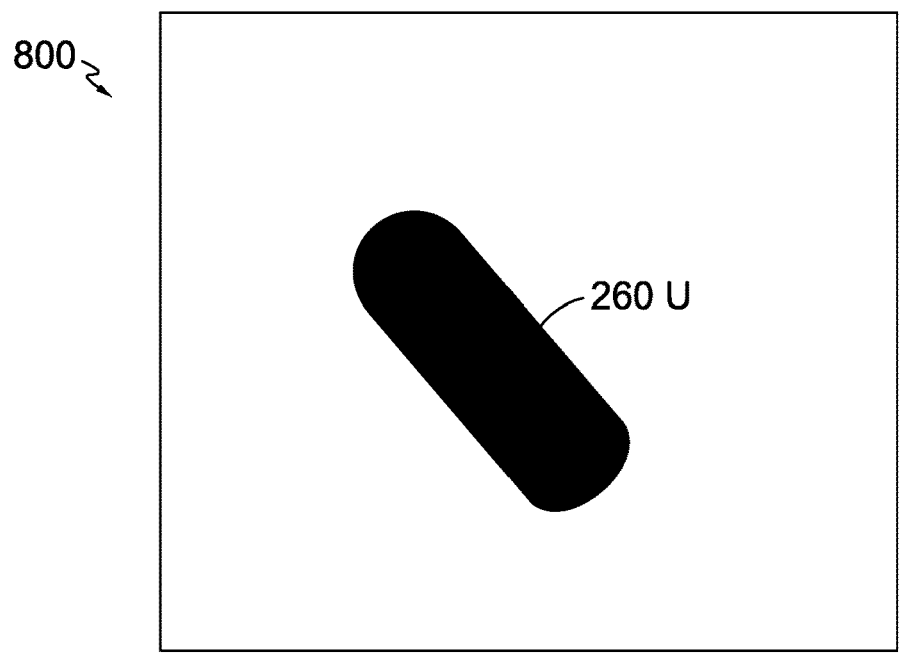
FIG. 8 is an illustration of a single shadow of an object after the other shadows have been filtered out, implemented in accordance with an embodiment of the present invention.

The next step in the process is exemplified in FIG. 8 in a view 800, whereby color component processing of the image captured in FIG. 7 begins. In this example, the red shadow 260 C of FIG. 7 is used. The shadow of the red source will appear dark in the red component of the image, but not in the green and blue components. When the red component of the image is extracted and thresholded through image segmentation, the red shadow appears as the black area 260 U.

Figure 9:
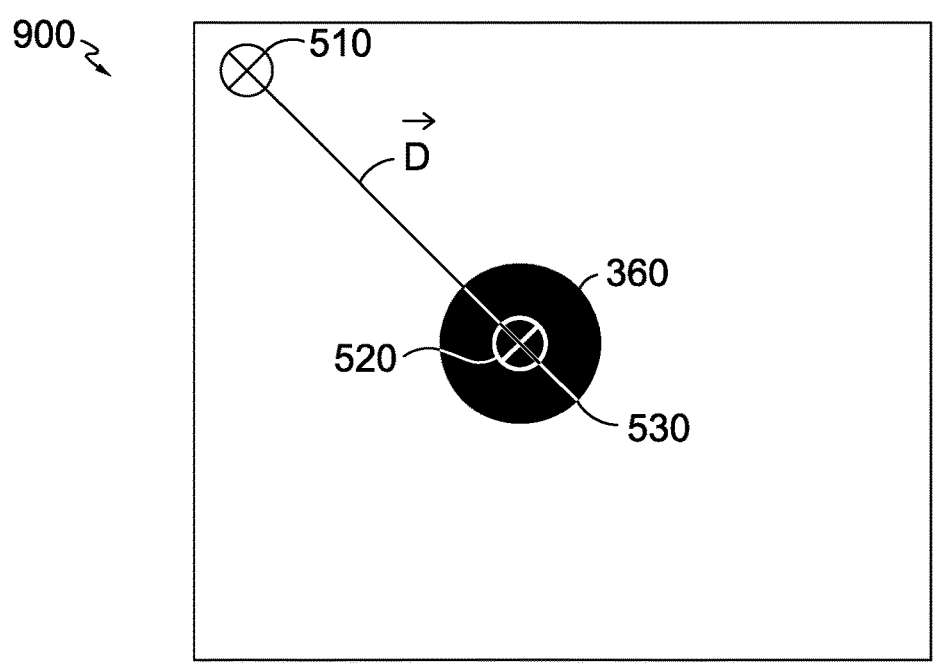
FIG. 9 is an illustration of a shadow direction vector, shadow of a colored source, and centroid, implemented in accordance with an embodiment of the present invention.

In the next processing step, represented in FIG. 9 in a view 900, a shadow direction vector D is calculated based upon the known location 510 of the red source (as projected onto the reference surface) and the centroid 520 of the previously-found item base shadow image 360. The vector D may then be extended in its current direction until it reaches a point 530 at the edge of the base shadow image 360. The length of vector D now represents the distance from the source to the edge of the item and is termed $d_{source}$.

Figure 10:
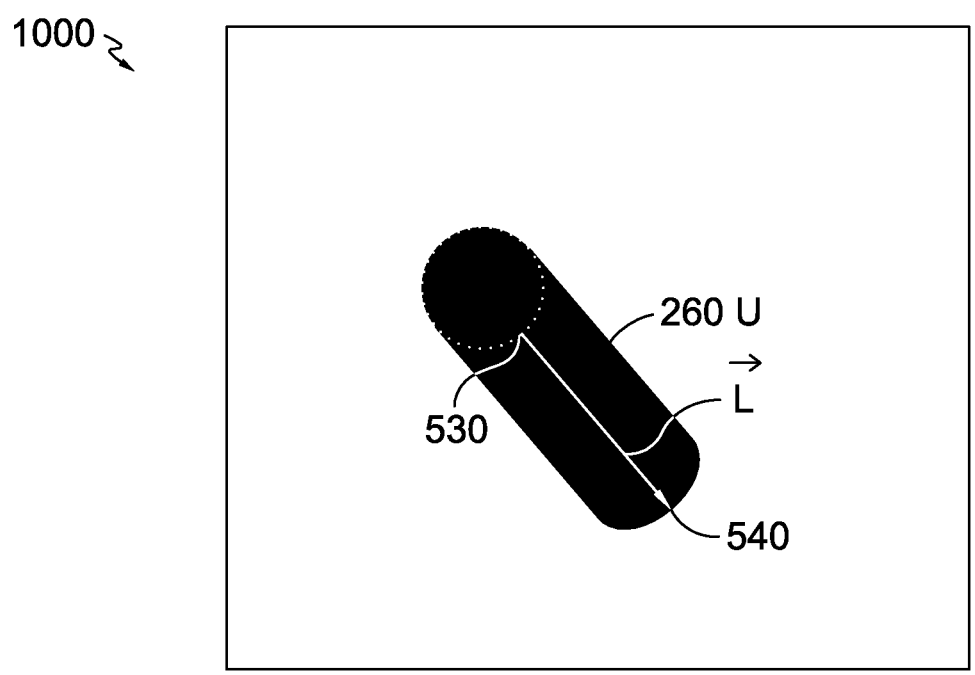
FIG. 10 is an illustration of a vector and shadow of a colored source, implemented in accordance with an embodiment of the present invention.

In the next part of the sequence, shown in FIG. 10 in a view 1000, a vector L is calculated from the threshold (or image processed) red shadow image 260 U, beginning at point 530 as found in the previous step in FIG. 9 on the base threshold image 360, and continuing along the same direction as vector D from FIG. 9, finally ending at point 540 where the end of the item's shadow is indicated by a dark-to-light transition in grayscale. The length of vector L represents the item's shadow length $I_{shadow}$.

Figure 11:
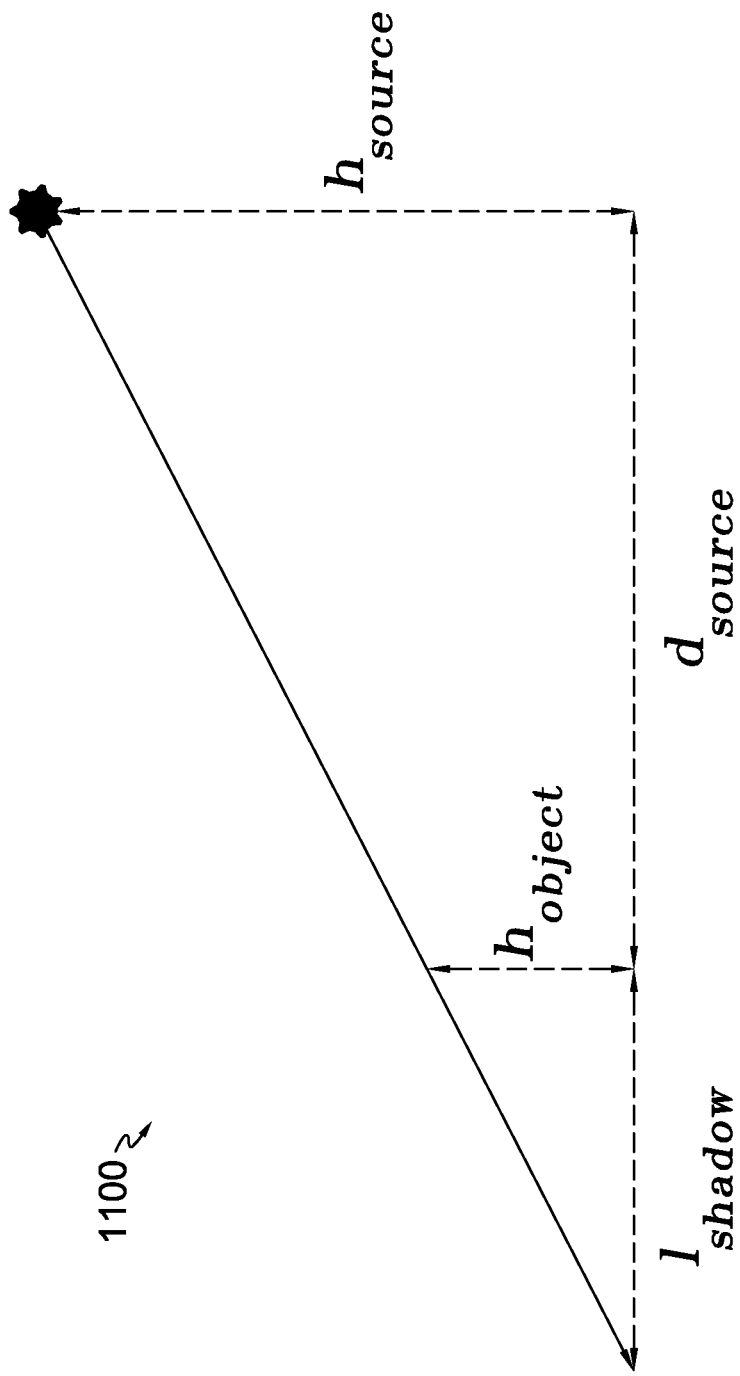
FIG. 11 is an illustration of triangular relationships used to calculate the height of an object, implemented in accordance with an embodiment of the present invention.

In the another step of this procedure, the approximate height of the object, $h_{object}$ is calculated based upon the known height of the light source $h_{source}$ using triangular relationships depicted in FIG. 11 in a view 1100.

Figure 12:
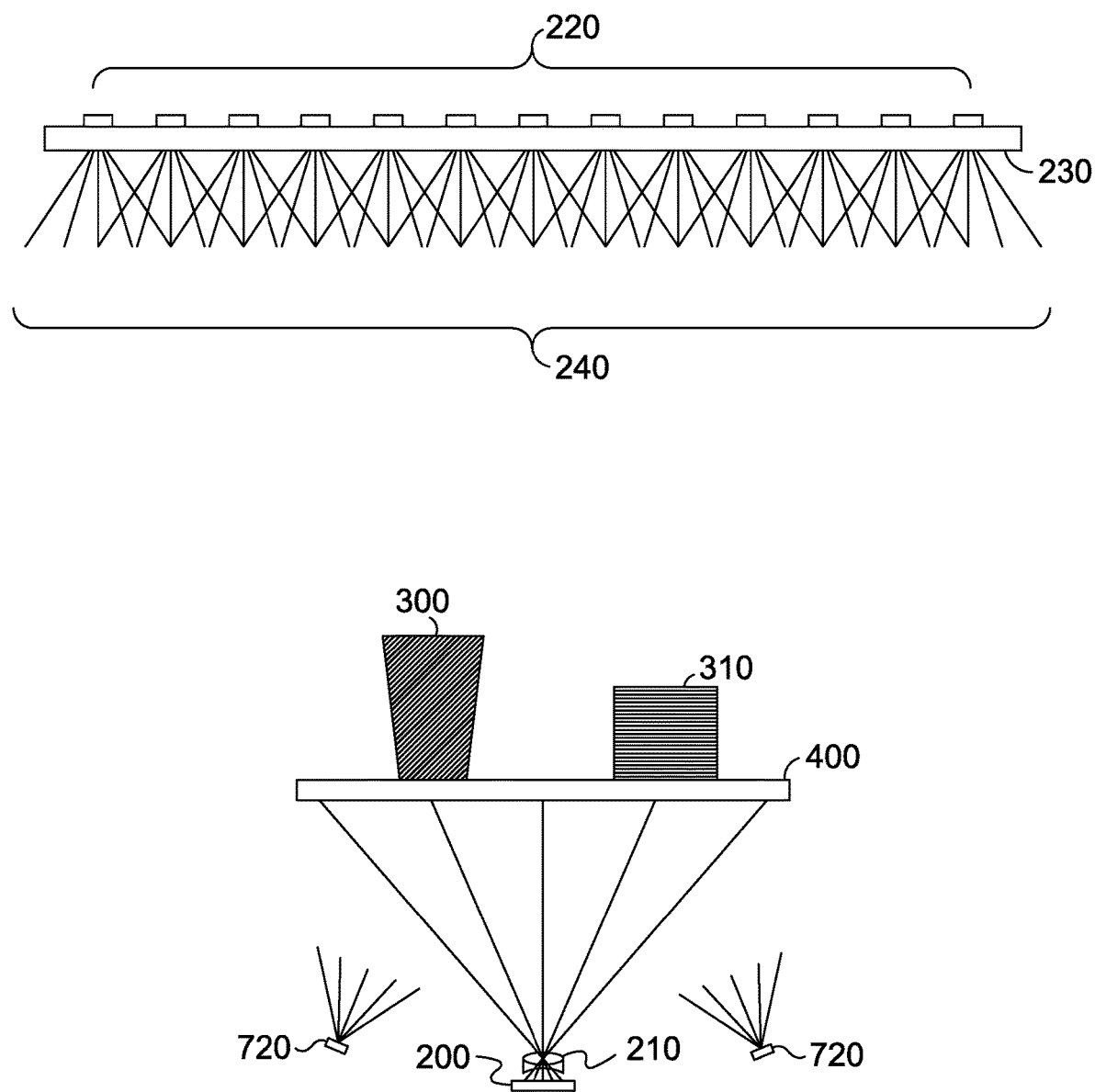
FIG. 12 is an illustration of another system for determining the location and size of an object, implemented in accordance with an embodiment of the present invention.

In yet another step, shown in FIG. 12, item identification is attempted. Here, the reference surface 400 is switched to its transparent state, illumination sources 720 (typically white) are turned on, and the camera comprising 200 and 210 below the transparent surface may capture an image or images of the objects from below. This image or images may be analyzed for bar codes, 2D codes, colors or color codes, digital watermarks, textual information, or other recognizable features.

Figure 13:
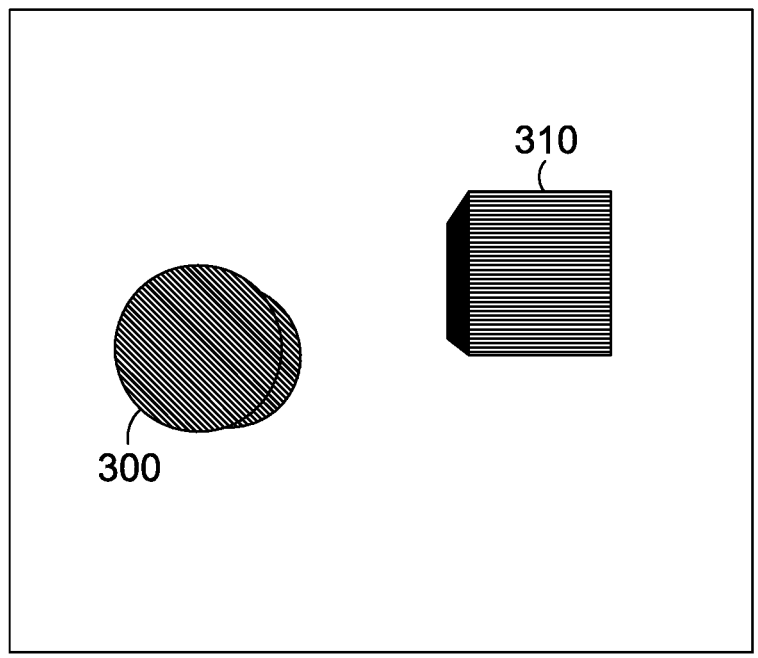
FIG. 13 is an illustration of a camera view from below a transparent reference surface with enabled illuminators.

FIG. 13 depicts how items 300 and 310 would appear when viewed from below by the camera through the transparent reference surface with illuminators 720 enabled.

Although embodiments were described using a color camera, in an alternative embodiment, a monochrome camera may be used with the phases of base detection with multiple sources. Shadow measurements may be performed with monochrome resources.

Many different arrangements of the various components depicted, as well as components not shown, are possible without departing from the spirit and scope of embodiments of the present invention. Embodiments of the present invention have been described with the intent to be illustrative rather than restrictive. Certain features and sub-combinations are of utility and may be employed without reference to other features and sub-combinations and are contemplated to be within the scope of the claims.

What is claimed is:

1. An object recognition system for determining a location, delineation, and measurement of an item, comprising:
a surface that holds the item, a plurality of light sources that surround the item on the surface, an imaging system, and a processor having a memory, wherein the surface is diffuse or transparent;
the plurality of light sources is located in a position that minimizes shadows of the item on the surface, wherein the imaging system detects a shadow outline of a base surface of the item, wherein the base surface is where the item contacts the surface;
the plurality of light sources includes subsets of red light sources, green light sources, and blue light sources, wherein the red light sources, green light sources, and blue light sources respectively form colored shadows of the item on the surface, wherein the colored shadows are captured in one color image by the imaging system; and
the processor calculates a position, an exterior or delineation, or a height of the item on the surface.

2. The object recognition system of claim 1, wherein the plurality of light sources is located in a position that minimizes shadows comprises the plurality of light sources located above the surface on a suspended mounting structure.

3. The object recognition system of claim 2, wherein the imaging system is connected to a color camera.

4. The object recognition system of claim 3, further comprising the imaging system performs processing to segment the one color image.

5. The object recognition system of claim 2, wherein the imaging system is connected to a monochrome camera.

6. The object recognition system of claim 1, wherein:
the imaging system comprises a camera, wherein the camera is mounted below the surface such that a field-of-view of the camera captures an entire area of the surface where objects are placed;
the plurality of light sources that surround the objects are located above the surface at a height that does not interfere with the objects on the surface, but creates shadows of the objects that are on the surface;
the plurality of light sources illuminate the objects from various angles surrounding the objects, wherein an illumination of the objects produce dark areas;
the camera mounted below the surface collects an image of the dark areas from under the objects' bases, wherein the imaging system processes the image to enhance the location and shape of the objects' bases.

7. The object recognition system of claim 6, further comprising:
the processor determines centroids and boundaries of the objects' bases;
the plurality of light sources illuminate the objects with three different color sources, each separated by approximately ninety (90) degrees in azimuth;
the imaging system captures an image of the objects' shadows using the camera below the surface, wherein components of the image are selected to obtain distinct object shadow information; and
object heights are determined using the previously determined object base locations and boundaries data along with the objects' shadow information and information about the location of the plurality of light sources.

8. The object recognition system of claim 7, wherein the surface comprises a diffuse, white light-translucent surface.

9. The object recognition system of claim 7, wherein the camera is a color camera.

10. The object recognition system of claim 9, wherein the objects' shadows are objects' color shadows and the components are color components.

11. The object recognition system of claim 7, wherein the camera is a monochrome camera.

12. The object recognition system of claim 7, wherein the reference surface switches to a transparent state.

13. An object recognition system for determining a location, delineation, and measurement of an item, comprising:
a surface that holds the item, a plurality of light sources that surround the item on the surface, an imaging system, and a processor having a memory;
the surface switchable between an optically translucent state and an optically transparent state;
the plurality of light sources is located in a position that minimizes shadows of the item on the surface, wherein the imaging system detects a shadow outline of a base surface of the item, wherein the base surface is where the item contacts the surface;
the plurality of light sources includes subsets of red light sources, green light sources, and blue light sources, wherein the red light sources, green light sources, and blue light sources respectively form shadows of the item on the surface when the surface is in the optically translucent state, wherein the shadows are captured in one image by the imaging system; and the processor calculates a position, an exterior or delineation, or a height of the item on the surface.

14. The object recognition system of claim 13, wherein the plurality of light sources is located in a position that minimizes shadows comprises the plurality of light sources located above the surface on a suspended mounting structure.

15. The object recognition system of claim 14, wherein the imaging system is connected to a color camera, the shadows are colored shadows, and the one image is one color image.

16. The object recognition system of claim 15, further comprising the imaging system performs processing to segment the one color image.

17. The object recognition system of claim 14, wherein the imaging system is connected to a monochrome camera.

18. The object recognition system of claim 14, wherein the surface switches to the transparent state.

* * * * *